United States Patent Office
3,193,939
Patented July 13, 1965

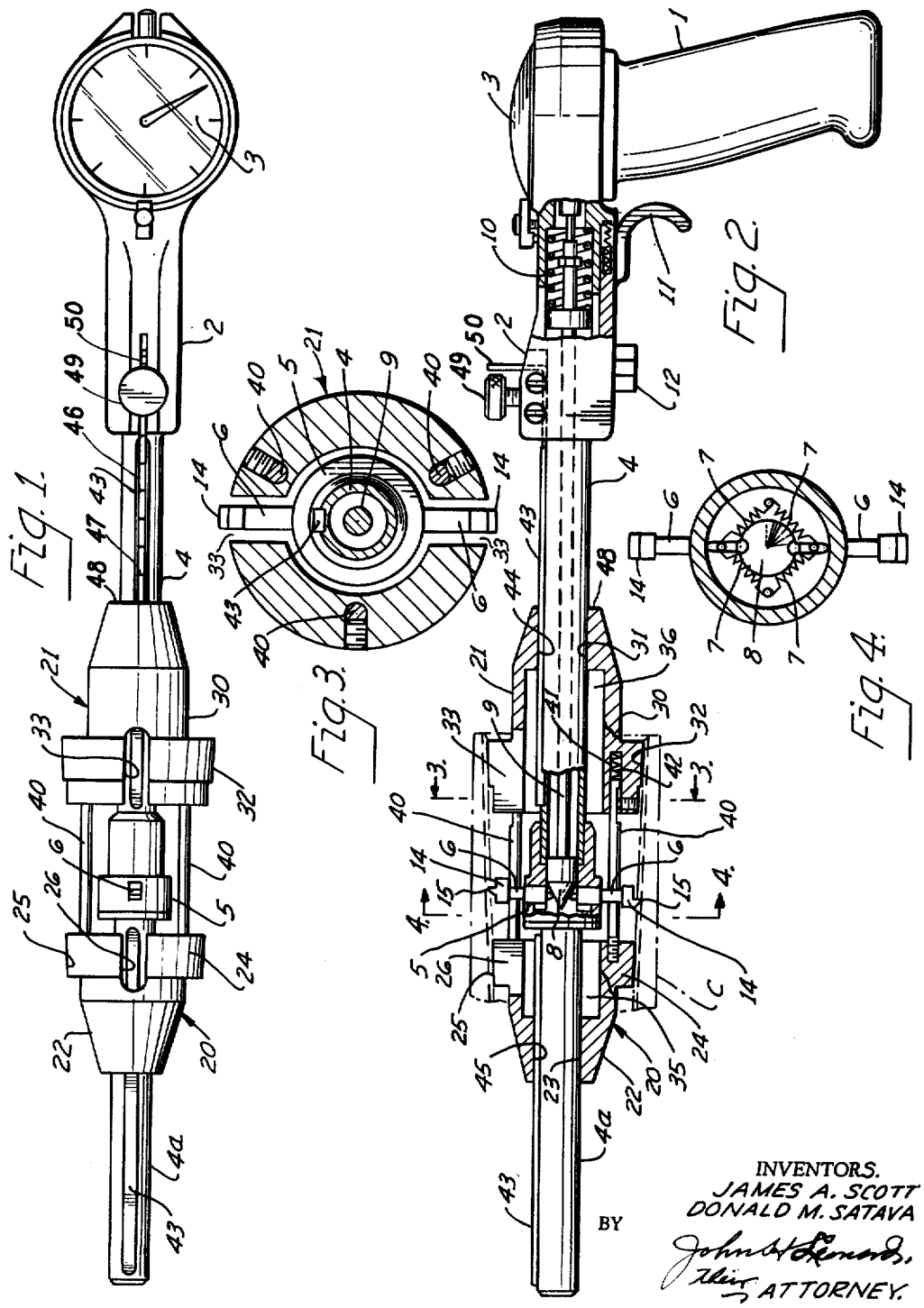

3,193,939
TAPER GAUGE FOR GAUGING WALLS OF TAPERED PASSAGES
James A. Scott, Pittsburgh, Pa., and Donald M. Satava, Wickliffe, Ohio; said Satava assignor to The Pipe Machinery Company, Wickliffe, Ohio, a corporation of Ohio; said Scott assignor to United States Steel Corporation, a corporation of New Jersey
Filed Nov. 1, 1962, Ser. No. 234,754
11 Claims. (Cl. 33—174)

This invention relates to a taper gauge for gauging the taper of the peripheral wall of a tapered passage such, for example, as the interior of the wall of a pipe coupling, sleeve, or bore in a body, and is applicable to both threaded and smooth walls.

For purposes of illustration, a gauge embodying the present invention is described herein as applied to the measurement of the taper of the thread of an internally threaded pipe coupling.

Heretofore various gauges have been provided for gauging the tapers of internal threads. One problem common to the prior gauges is the proper positioning of the gauging head with respect to the axis of the thread, and particularly with respect to a plane normal to the thread axis at the gauging location. Generally, in such gauges, the attempt is made to hold the gauge in the optimum position wherein the gauging points lie in, or very closely adjacent to, a plane normal to the thread axis, allowance in their deviation therefrom being made for the pitch of the thread. To hold the gauge with the points so positioned while it is in inserted position in a coupling requires great skill, and unless extreme care is taken by a highly experienced workman, the gauge is tilted so that the position of the points departs substantially from the optimum.

Attempts have been made to overcome this difficulty by providing on the portion of the device which is to be inserted into the coupling one or more aligning members which engage the interior wall of the coupling, defined by the crest of the thread in the case of a threaded coupling, and constrain the gauging head to proper untilted position. A single frusto-conical aligning member is not generally satisfactory as it does not impart sufficient stability. Two frusto-conical members, spaced axially of the coupling have been provided, but in combination with a single gauging point. However, in gauging in this manner, the frusto-conical aligning members themselves become gauging elements, wherefore inaccuracies in the diameters of their wall engaging surfaces produce corresponding inaccuracies in the gauge reading.

In accordance with the present invention, a gauge employing a plurality of gauging points for cooperation with the internal wall of a threaded coupling is combined with a plurality of aligning members of which the exterior peripheral walls engage the interior wall of the coupling and constrain the gauging head to a position in which the points are in the optimum position relative to a plane normal to the axis of the coupling. These aligning members are not gauging members, but are merely aligning members, the gauging resulting entirely from disposing the points in proper contact with the wall of the coupling. The aligning surfaces of the members are sufficiently accurate to maintain the head substantially in untilted relation to the planes normal to the axis of the coupling. Consequently, should slight inaccuracies in diameter of the aligning surfaces occur, due to wear and the like, such inaccuracies would not be directly reflected in the gauge reading. At most such a slight tilting relative to the plane would make no difference in the gauge reading detectable within the limits of precision of commercial gauges.

One of the principal objects of the present invention is to provide a gauge with a gauging head and aligning means combination which is insertable into a coupling for holding the head precisely with its points substantially in a plane normal to the axis of the coupling while permitting movement of the head axially of the coupling, suitable indicia being provided for indicating the distance to which the head has been inserted axially of the coupling, and an indicating means being provided for indicating the gauge at such locations.

Various other objects and advantages will become apparent from the following description wherein reference is made to the drawing, in which:

FIG. 1 is a top plan view of a gauge structure embodying the principles of the present invention;

FIG. 2 is a front elevation of the structure illustrated in FIG. 1, part thereof being shown in section for clearness in illustration;

FIG. 3 is an enlarged vertical cross sectional view taken on the line 3—3 in FIG. 2; and FIG. 4 is an enlarged fragmentary cross sectional view, taken on line 4—4 of FIG. 2, and showing the interior of the gauging head.

Referring to the drawings, the gauging device itself as shown is a conventional one which can be purchased on the market. It comprises essentially a handle 1 which carries a body 2 on which is mounted a dial type indicator 3. Mounted by one end in the body 2 is an elongated support comprising a portion 4, preferably in the form of a tube, and an extension 4a. On the opposite end of the support portion 4 is mounted a gauging head 5 which supports a plurality of gauging elements or fingers 6 which are disposed in spaced relation to each other circumferentially of the axis of the support 4 and, therefore, will be so positioned relative to the axis of a pipe coupling C, of which the internal taper is to be gauged. In the illustrative example, each of the elements 6 is mounted in the head 5 for endwise movement radially of the head to extended and retracted positions. The elements are urged inwardly toward retracted condition by associated springs 7.

In order to move the elements 6 outwardly for applying their outer ends as gauging points to the inner wall of the coupling, a cone 8 is provided. The cone 8 is mounted on a rod 9 which preferably is coaxial with the tube 4. A spring 10 mounted in the body 2 is connected to the rod 9 so as to urge it axially in the direction for advancing the cone for moving the elements 6 to extended positions. To retract the cone 8 to permit movement of the elements 6 to retracted positions by the springs 7, preparatory to insertion of the head into the pipe coupling, a suitable trigger 11 is operatively connected to the rod for pulling it in a direction to retract the cone 8. If desired, a trigger latch 12 may be provided in the body for latching the trigger 11, and thereby the cone 8, in retracted position.

For the purpose of the present invention, the portion 4a of the support extends from the head 5 in a direction away from the body 2 and is coaxial with the portion 4. Thus the entire support is an elongated straight member which can be inserted to the desired distance into the pipe coupling C. If the pipe coupling to be gauged is threaded internally, as illustrated, then the gauging points of the elements 6 may be provided by appropriate gauge tips 14 arranged on the elements at their outer ends, respectively. The tips have thread engaging points 15 offset slightly endwise of the support 4 to compensate for the pitch of the thread while the axes of the elements 6 lie in a common plane normal to the axis of the coupling.

The gauge thus far described is one invented by others and available on the market.

In order to assure that, during the gauging operation, the gauge is centered with respect to the coupling and the tips 15 lie substantially in a plane normal to the axis of the coupling, aligning members 20 and 21 are provided.

The members 20 and 21 are mounted on the support portions 4 and 4a, respectively, on opposite sides of the gauging head 5 for sliding movement along the support toward and away from each other while maintained in alignment with each other endwise of the support. The member 20 has a body portion 22 with axial passage 23 therethrough in which the portion 4a of the support is snugly accommodated for endwise guided sliding movement relative thereto. The body has an enlarged flange portion 24 which has an external gauging surface 25. This external gauging surface is preferably frusto-conical, particularly where the taper of internal threads are to be gauged. The surface 25 thus provides a plurality of wall engaging areas which engage the interior wall of the coupling passage at sufficient locations distributed about the axis of the coupling passage to assure that the body 22 is positioned with the axes of the elements 6 in a plane normal to the axis of the coupling and preferably with the support coaxial with the coupling passage.

In the form illustrated, the wall engaging areas are provided by making the frusto-conical surface 25 substantially continuous circumferentially, except for a slot or lineal passage 26 for purposes later to be described. The taper of the frusto-conical surface 25 corresponds approximately to the taper of the internal passage to be gauged.

The member 21 is essentially the same in operating effect and comprises a body 30 having an axial passage 31 in which the support portion 4 is snugly accommodated for guided sliding movement endwise of the support. The member 21 has a frusto-conical surface 32, corresponding to the surface 25 of the member 20, and which is continuous except for a slot or lineal passage 33. Thus both members 20 and 21 are mounted on the support for sliding endwise thereof with their aligning surfaces 24 and 32 in a coaxial relation with each other. Furthermore, each is slidable along and relative to the support independently of the other.

The larger base of the surface 24 is of smaller diameter than the smaller base of the surface 32 and the surfaces are disposed with the larger base of the surface 24 facing toward, and adjacent to, the smaller base of the surface 32.

It is desirable at times to gauge the interior of the pipe coupling at different positions along the length thereof while the members 20 and 21 remain in fitting relation to the wall of the coupling passage. Ofttimes, these positions are at locations along the length of the coupling at which the members 20 and 21 are disposed.

Also, it is desirable in many instances that the members 20 and 21 be disposed so that their adjacent ends are substantially in contact with each other in some positions. For these purposes, there is provided in the end of the member 20, adjacent the member 21, an internal cavity 35 which is large enough radially to accommodate the gauge head 5. A corresponding cavity 36 is provided in the member 21. These cavities are deep enough so that the members can be moved inwardly in end to end relation and the body 5 accommodated in either cavity or in both together.

The slots 26 and 33 are such that, when the body 5 is accommodated in whole or part in either cavity, the elements 6 can extend through the slots, thereby permitting gauging by the tips 15 throughout the axial extent of the surfaces 24 and 32.

It is desirable that the member 21 be positioned so that it fits substantially at the entry end of the coupling passage. It is then necessary that the member 20 be moved endwise into the passage until its surface 24 seats properly on the passage wall, thereby providing proper positioning and alignment of the coupling and the support 4. For this purpose, means are provided for moving the member 20 endwise of the support relative to the member 21. In the form illustrated, this means comprises a plurality of pins 40 which are fixedly mounted at one end in one of the members, for example, the member 20, and, at their other ends, extend into bores 41 in the other member which, in the form illustrated, is the member 21. The pins are snugly received in sliding engagement within the bores 41, thus maintaining the members 20 and 21 in fixed position circumferentially of the support relative to each other.

Resilient means are provided for yieldably urging the members apart endwise of the support. These may comprise springs 42 interposed in the bores 41 between the ends of the rods 40 and the bottoms of the bores, as illustrated. To assure proper circumferential relation of the members 20 and 21 on the support, a suitable longitudinal key 43 is provided and is engaged with suitable corresponding keyways 44 and 45 in the bodies 22 and 30.

As mentioned, both of the members 20 and 21 are movable endwise of the support 4 not only relative to each other but relative to the support itself. This is to permit movement of the gauging head 5 to different distances axially within the coupling after the surfaces 24 and 32 fit the internal surface of the pipe. In order to determine the distance to which the head 5 and gauging tips are inserted, the tube or support 4 is provided with a gauge rod 46 which has indicia 47 which indicates the distance between measuring points, that is, between the planes of the axes of the elements 6 at the locations at which gauging is desired. This scale is so arranged that the outer end 48 of the member 21, by its position along the gauge 46 indicates the distance of insertion of the head, as described. The gauge rod 46 is slidably adjustable endwise of the support and may be clamped in adjusted position by the thumb screw 49. One end of the gauge 46 is bent up to provide an operating finger 50.

In order to gauge the taper of the internally threaded coupling C, the trigger 11 is pulled toward the handle 1, releasing the elements 6 so that their springs 7 draw them to a retracted position. In this condition the support 4 and 4a is moved to carry the members 20 and 21 into the coupling. Generally, the members are held in their fully spaced relation by the springs 42, and consequently the frusto-conical surface 24 of the member 20 first engages the inner wall of the coupling, as defined by the crests of the thread, and assumes a fixed position axially relative to the coupling. Upon continued movement, the member 21 is moved into the coupling until its surface 32 engages the interior wall, as defined by the crests of the thread, the springs 42 being compressed by this movement to the degree desired to permit both surfaces 24 and 32 to be in proper fitting engagement and in coaxial relation to the coupling passage.

While in this position, the plane of the axes of the elements 6 is normal to the axis of the coupling passage so that accurate gauging will result. Neither of the surfaces 24 or 32 effects any gauging, the gauging being effected totally by the elements 6, and the members 20 and 21 being operative only to hold the support 4 in parallel relation with the axis of the passage. Again, while in this position, the support 4 may be moved axially of the coupling to dispose the elements 6 at the positions at which gauging is desired. While so moving, the trigger is held or latched in retracted position. Due to the cavities 35 and 36, and the slots 26 and 33, the elements 6 can be moved so as to engage the interior wall of the coupling all the way from the outermost end of the surface 25 to the outermost end of the surface 32, the degree of insertion being indicated by the position of the indicia on the gauge rod 46 relative to the end 48 of the member 21.

Having thus described a specific embodiment of our invention for purposes of illustration, it is apparent therefrom that modifications may be made therein without de-

We claim:

1. A self-centering internal taper gauge comprising an elongated support, a gauging head carried by the support, a plurality of movable gauging elements carried by the head, in spaced relation to each other about the support, for movement toward and away from the support to extended and retracted gauging positions, means for moving said elements outwardly to gauging positions, gauge indicating means carried by the support and operated by movement of said elements to said positions, for indicating gauge, characterized by first and second aligning members mounted on the support for movement relative to each other endwise thereof while in alignment with each other endwise of the support, said members having rigid external aligning surface means, respectively, disposed about, and spaced outwardly from, the support and capable of engaging the internal tapered peripheral wall of a frusto-conical passage of circular cross section when the support is disposed within, and extends endwise of, the passage, said surface means of one member being spaced endwise of the support from the surface means of the other member, said surface means of the first member being spaced outwardly from the support a greater distance than are said surface means of the second member, whereby said surface means of the first member are capable of fitting such an internal wall at a larger diameter portion than are said surface means of the second member and thereby of holding the support in a fixed predetermined position radially of the axis of the passage, and operating means for moving the members away from each other endwise of the support.

2. The structure according to claim 1 wherein said surface means of said members are frusto-conical surfaces, respectively, one on each member, said surfaces being circular in cross section, and the smaller base of the frusto-conical surface of the first member being in axially spaced face to face relation to the larger base of the frusto-conical surface of the second member.

3. The structure according to claim 1 wherein each of said members is also movable endwise of the support relative to the support.

4. The structure according to claim 3 wherein indicating means are provided for indicating the endwise movement of the support relative to said first member.

5. A structure according to claim 1 wherein said head is mounted on the support between the members.

6. A structure according to claim 1 wherein the operating means are springs operatively interposed between the members and yieldably urging them away from each other axially.

7. A structure according to claim 1 wherein said members have aligned central passages, respectively, through which the support extends and in which it is snugly received for supporting the members for said movement while maintaining them in said alignment, said head is disposed between the adjacent ends of the members, the passage of each member has an enlarged cavity portion at the one end of the member adjacent the other member, so that, when the adjacent ends of the members are near each other, the head can be accommodated in said enlarged cavity portions.

8. A structure according to claim 7 wherein each member has a lateral passage therein extending transversely through the peripheral wall of the member from said enlarged cavity portion outwardly, and being open at the outer end of the lateral passage, and extending endwise of the member from said one end of the member at least partway of the length of said member, and said lateral passage is open at said one end of the member and positioned to accommodate said elements when the body is in the enlarged cavity portion of the associated member.

9. A self-centering internal taper gauge comprising an elongated support, a gauging head carried by the support, gauging elements mounted in the head in circumferentially spaced relation to each other about a common axis for movement toward and away from said axis to extended and retracted positions, means for moving the elements outwardly to gauging positions, gauge indicating means carried by the support and operated by movement of said elements to said positions, for indicating gauge, characterized by first and second aligning members having wall engaging, external aligning surfaces of circular cross section, respectively, said members being mounted on said support, with the aligning surfaces coaxial with each other and surrounding the support, for movement relative to each other endwise of the support while the surfaces remain in coaxial relation, the aligning surface of the first member being of greater diameter than the aligning surface of the second member, and means connected to the members yieldably urging the members relatively away from each other endwise of the support.

10. A self-centering internal taper gauge comprising an elongated support, a gauging head carried by the support between its ends, gauging elements mounted in the head in circumferentially spaced relation to each other about a common axis and for movement toward and away from said axis to extended and retracted positions, means for moving the elements outwardly to gauging positions, gauge indicating means carried by the support, said support having an endwise passage extending endwise thereof from said head, mechanical means in said head and endwise passage operated by movement of the elements to said positions for operating the indicating means in response to the outward positions of said elements, first and second rigid aligning members, each having a wall engaging, external aligning surface of circular cross section and a coaxial central passage, said support being slidably accommodated in said passages and supporting the members with the aligning surfaces coaxial with each other, said members being movable relative to each other and to the support endwise of the support while the surfaces remain in said coaxial relation, the surface of the first member being of greater diameter than the surface of the second member, and means yieldably urging the members relatively away from each other endwise of the support.

11. A gauge according to claim 10 wherein gauge indicia are carried on the support and arranged in a row extending endwise thereof, and means on the first member to cooperate with the indicia for indicating the depth of axial insertion of the gauging head into a tapered bore being gauged.

References Cited by the Examiner
UNITED STATES PATENTS

| | | | |
|---|---|---|---|
| 2,312,222 | 2/43 | Tanner | 33—178 |
| 2,363,587 | 11/44 | Hardware | 33—128 |
| 2,490,376 | 12/49 | Rupley | 33—174 |

ISAAC LISANN, *Primary Examiner.*